United States Patent [19]

Hurst et al.

[11] Patent Number: 5,422,929
[45] Date of Patent: Jun. 6, 1995

[54] TELEPHONE LINE REPEATER AND METHOD OF TESTING SAME

[75] Inventors: George J. Hurst; Joseph F. Sturbois, both of Huntsville, Ala.

[73] Assignee: TXPORT, Inc., Huntsville, Ala.

[21] Appl. No.: 791,251

[22] Filed: Nov. 13, 1991

[51] Int. Cl.⁶ ............................................. H04B 3/46
[52] U.S. Cl. ...................................... 379/4; 379/338;
379/344; 379/347; 371/20.1; 371/20.2; 370/13;
370/85.5
[58] Field of Search ................ 379/4, 5, 22, 26, 338,
379/342, 344, 347–348, 29; 371/20.1, 20.2, 20.4,
20.5, 20.6; 370/13.1, 13, 15, 85.5, 85.15; 178/71
T, 69 G, 2 C; 375/3, 3.1

[56] References Cited

U.S. PATENT DOCUMENTS

| 4,161,634 | 7/1979 | Bellisio | 178/2 C X |
| 4,630,268 | 12/1986 | Rodenbaugh | 379/4 X |
| 4,896,317 | 1/1990 | Nakama et al. | 370/13.1 |
| 4,939,747 | 7/1990 | Adler | 375/3.1 |
| 4,980,887 | 12/1990 | Dively et al. | 379/4 X |
| 5,010,544 | 4/1991 | Chang et al. | 370/13.1 |
| 5,060,226 | 10/1991 | Gewin et al. | 370/15 |
| 5,184,081 | 2/1993 | Oswald et al. | 324/533 |
| 5,191,595 | 3/1993 | Parsons | 370/13.1 X |
| 5,224,149 | 6/1993 | Garcia | 379/5 |

OTHER PUBLICATIONS

Westell, 030–100352 Rev. P8, "T1 Line Repeater With Addressable Loopback Plus,", Section 3150–00–100, Issue A, Apr. 1991.

Westell, 030–200119 Rev A., "T1 Office Repeater With Addressable Loopback", Apr. 1990.

Westell, 030–100309 Rev. A, "3130–01 T1 Office Repeater With Addressable Loopback", Section 3130-0-0-100, Issue A, Dec. 1990.

Westell, 030–100292 Rev. A, "3112-52 T1 Facility Loopback Unit", Section 3112-52-100, Issue A, April 1990.

Westell, 030–100311 Rev. A, "3117-XX Family of T1 Extension Repeaters", Section 3117-XX-100, Issue A, Apr. 1990.

Westell, 030–200108 Rev A, "Family of T1 Extension Repeaters", Feb. 1990.

*Primary Examiner*—James L. Dwyer
*Assistant Examiner*—M. Shehata
*Attorney, Agent, or Firm*—Nixon & Vanderhye

[57] ABSTRACT

A telephone line repeater (28) includes a pattern decoder/recognizer (100) which recognizes, inter alia, an input interrogating signal transmitted on a telephone network (20). The interrogating signal includes an address field (302) having at least one subfield (304) therein. The pattern decoder (100) determines that its repeater (28) is to be tested, if a predetermined subfield (304) of the interrogating signal is configured according to a predetermined select convention. When the repeater (28) recognizes that it is being addressed, a controller (110) causes the addressed repeater to "loop back", returning, in alternating sequence, test-indicative no-operation signals and diagnostic information ("DSM") signals generated by the repeater. Methods for testing a repeater and methods for testing telephone networks are also disclosed.

38 Claims, 8 Drawing Sheets

TELEPHONE LINE REPEATER AND METHOD OF TESTING SAME

BACKGROUND

1. Field of Invention

This invention pertains telephone line repeaters used in the telephone industry, and particularly to a testable line repeater and a method of testing the same.

2. Prior Art and Other Considerations

Telephone central offices are connected by cables comprising networks of twisted wire pairs. The twisted wire pairs carry parallel transmissions. For example, a twisted wire pair on a first side (side 1) of the network carries transmission from a first central office to a second central office, while a corresponding twisted wire pair on a second side (side 2) of the network carries transmission from the second central office to the first central office.

In accordance with a widely used T-1 transmission format, each side of the twisted wire pair network has transmissions from twenty four channels multiplexed thereon at a rate of 1.544 megabits per second. The transmission signals are encoded in an alternate mark inversion, tri-level return to zero (RZ) format.

Devices known as repeaters are typically installed on twisted wire pairs between the central offices for the purpose of regenerating the signals transmitted therealong. Otherwise, the signals might be so degraded or deteriorated, by reason of the physical distance separating central offices or environmental (e.g., noise) considerations, that the signals are not receivable at the receiving central office. A number of repeaters, perhaps as many as twenty or so, may be installed between two central offices. The distance between each repeater is known as a span.

A repeater typically includes input and output transformers for each side of the twisted pair network. An input signal from the input transformer is connected to an automatic line build out (ALBO) device, which in turn is connected to a regenerator. A regenerated signal from the regenerator is applied to the output transformer for further application to the same side of the twisted pair network.

Equipment faults or other difficulties can arise in transmissions between central offices. For example, the twisted pairs may be cut or severed at any point between the central offices. As another example, one of the repeaters positioned intermediate the central offices may malfunction.

The task of pinpointing a fault or difficulty along a T-1 transmission line can be very formidable. The task typically involves human inspection, on a trial and error basis, of as many repeaters as are necessary to locate the fault or difficulty. In some instances the transmission lines traverse rugged terrain, making access to the repeaters extremely laborious In urban areas, the telephone lines and repeaters are often subterranean. Access to subterranean equipment is generally gained through manholes or the like. In many areas, due to environmental concerns and/or governmental regulations, the cost of obtaining access to the telephone equipment via manhole is substantial. Accordingly, regardless of location, a trial and error approach for locating a fault is perplexing and inefficient.

Various techniques have been proposed for remotely testing T-1 line repeaters. One technique involves connecting all the repeaters between central offices with a separate analog signal line for monitoring analog electrical signals at the repeaters. However, since the repeaters along the network are not individually addressable, should a fault or difficulty arise there is no way to determine at what particular repeater the fault arose.

Another technique for remotely testing repeaters involves assigning each repeater a unique address, for example by means of an electromechanical switch specially installed at the repeater. The central office chooses a repeater to test by transmitting up the network a specially coded pattern of information. Included in the coded pattern of information is the unique address of the repeater to be tested. Upon receipt of the coded pattern of information, the repeater having the addressed included in the coded pattern "loops" to return the specially coded pattern back to the originating central office. If a repeater returns the coded pattern addressed to it, the central office assumes that the repeater, and the network spans between the central office and that repeater, are functioning properly.

Assigning unique pre-set addresses to each repeater presents problems. For example, electromechanical switches can break or malfunction, particularly in the diverse and potentially radically variable climatic conditions in which telephonic equipment is expected to operate. Further, it is likely that, in the presetting of hundreds of switches for repeaters, some addresses will be set incorrectly. Moreover, should it be necessary to reconfigure a network to include additional repeaters at some intermediate point, it may also be necessary to reset the addresses of many of the repeaters (by manual access) in order to reflect the reconfiguration of the network.

Accordingly, in view of the foregoing, it is an object of the present invention to provide method and apparatus for remotely testing T-1 line repeater equipment installed in a telephonic transmission network.

An advantage of the present invention is the provision of method and apparatus for interrogating repeaters without requiring a preset address for each repeater.

Another advantage of the present invention is the provision of method and apparatus for obtaining diagnostic information pertaining to a T-1 line repeater without the use of separate analog wires.

SUMMARY

A telephone line repeater includes a pattern decoder/recognizer which recognizes, inter alia, an input interrogating signal transmitted on a telephone network. The interrogating signal, also known as a start loop signal, includes an address field having at least one subfield therein. The pattern decoder determines that its repeater is to be tested, i.e., that it is the repeater being addressed, if a predetermined subfield of the interrogating signal is configured according to a predetermined test select convention.

As the interrogating signal is initially transmitted on the network from a central office, the position of a subfield in the address field corresponding to a given repeater is in a predetermined relationship with a physical location or ordering of the given repeater with respect to the set of repeaters in the network. That is, the first subfield corresponds to the first repeater in the network; the second subfield corresponds to the second repeater in the network; and so forth.

In one mode of the invention, each subfield of the address field is a bit of digital data. As initially transmitted, the subfield for the repeater to be tested has stored therein a digital value which is different than the digital values of the other subfields. In particular, the subfield for the repeater to be tested has stored therein a digital zero value, while the remaining subfields in the address field have a digital one value stored therein. Thus the digital value zero is a test select value.

As a repeater in the network receives the test-inducing signal, a bit shifting circuit provided therein shifts the test select value in the address field toward the most significant bit in the address field, and transmits the thusly modified test-inducing signal to the next repeater in the network. In other words, the test select value is effectively slid forward in time by imposing a delay of two unit intervals. Should a repeater in the network receive a test-inducing signal having the test select value as the most significant bit in the address field, that repeater realizes that it is being addressed.

When a repeater recognizes that it is being addressed, the repeater modifies the test-inducing (i.e., start loop) signal to become a no-operation signal. In addition, the addressed repeater "loops back" to the central office which transmitted the test-inducing signal. In this regard, the addressed repeater returns to the central office, in alternating sequence, no-operation signals and diagnostic information ("DSM") signals generated by the repeater.

Included in the diagnostic information signals generated by the repeater and returned to the central office are signals indicative of regenerator equalizer gain, abnormal line condition, CRC error, bipolar violations, and framing errors. Detectors and sensors provided in the repeater detect and sense error conditions and store error values in corresponding error registers. Upon receipt of a test-inducing signal, the error values are loaded into a DSM register for generation of the diagnostic error message.

Methods for testing a repeater and methods for testing telephone networks are also disclosed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A is a diagrammatic view of the format and contents of a particular "start loop" code suitable for addressing a particular repeater in a set of repeaters.

FIG. 5B is a diagrammatic view of the format and contents of a particular "start loop" code after it has been shifted by a first repeater of a set of repeaters.

FIG. 5C is a diagrammatic view of the format and contents of a particular "start loop" code after it has been shifted by a second repeater of a set of repeaters.

FIG. 5D is a diagrammatic view of the format and contents of a particular "no-operation" resulting from a shifting operation accomplished by an addressed repeater in a set of repeaters.

FIG. 5E is a diagrammatic view of the format and contents of a "stop loop" code according to an embodiment of the invention.

FIG. 5F is a diagrammatic view of the format and contents of a generic "start loop" code suitable for testing for a simplex path cut in a repeater of an embodiment of the invention.

FIG. 5G is a diagrammatic view of the format and contents of a "start loop" code returned by a repeater having a cut simplex path.

DETAILED DESCRIPTION OF THE DRAWINGS

Figure 1:
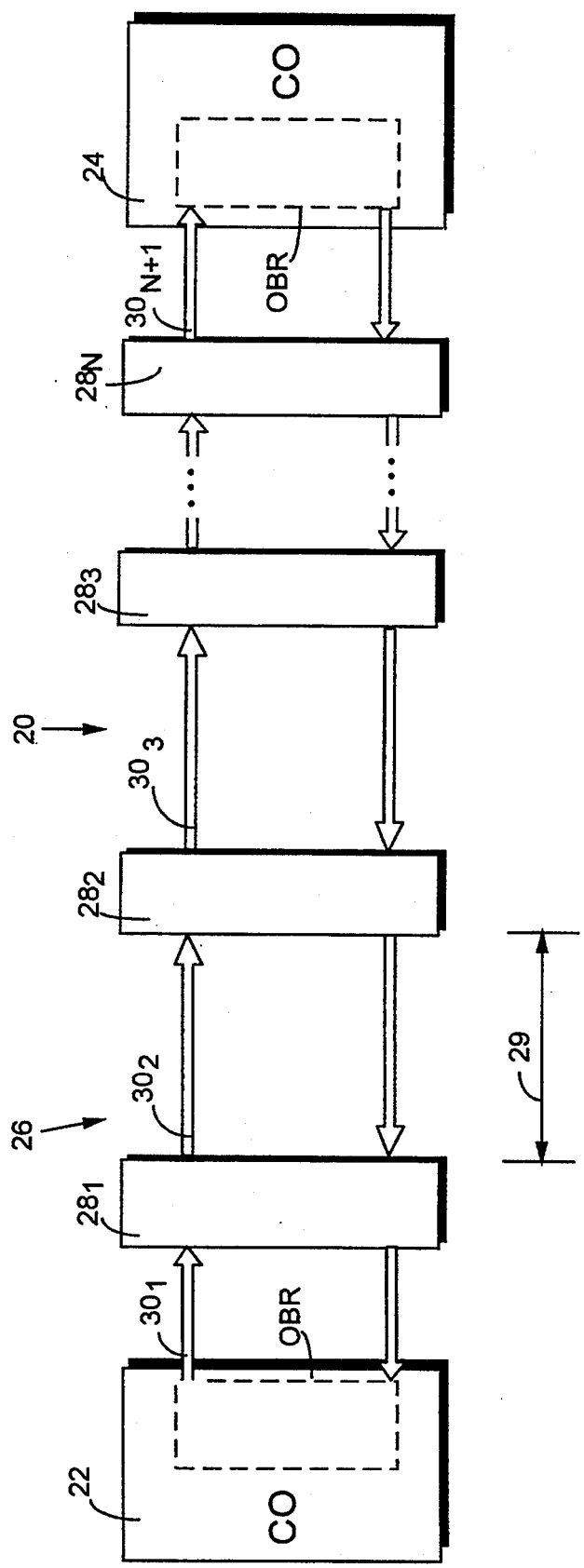
FIG. 1 is a schematic view of a telephone network system according to an embodiment of the invention.

FIG. 1 shows a telephone network 20 comprising a first central office (CO) 22; a second central office 24; a telephone line network 26 extending between the central offices 22 and 24; and, a plurality of repeaters $28_1$–$28_N$ provided at intermediate points on the telephone line network 26 between the central offices 22 and 24. The distance between repeaters 28, shown by arrow 29, is generally referred to as a "span". A half span separates the first repeater $28_1$ and the first central office 22; likewise, a half span separates the last repeater $28_N$ and the second central office 24.

The telephone line network 26 is shown in FIG. 1 as including line segments $30_1$–$30_{N+1}$ of a twisted wire pair on a first side (side 1) of the network 26, as well as line segments $32_1$–$32_{N+1}$ of a twisted wire pair on a second side (side 2) of the network 26. The line segments 30 carry transmissions from the first central office 22 to the second central office 24, while the line segments 32 carry transmissions from the second central office 24 to the first central office 22.

Figure 2:
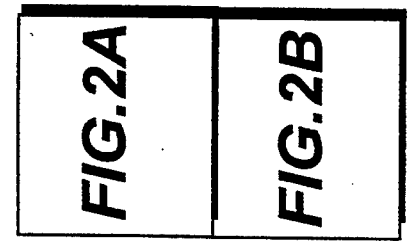
FIG. 2 is a schematic view showing the relationship of FIGS. 2A and 2B.
Figure 2A:
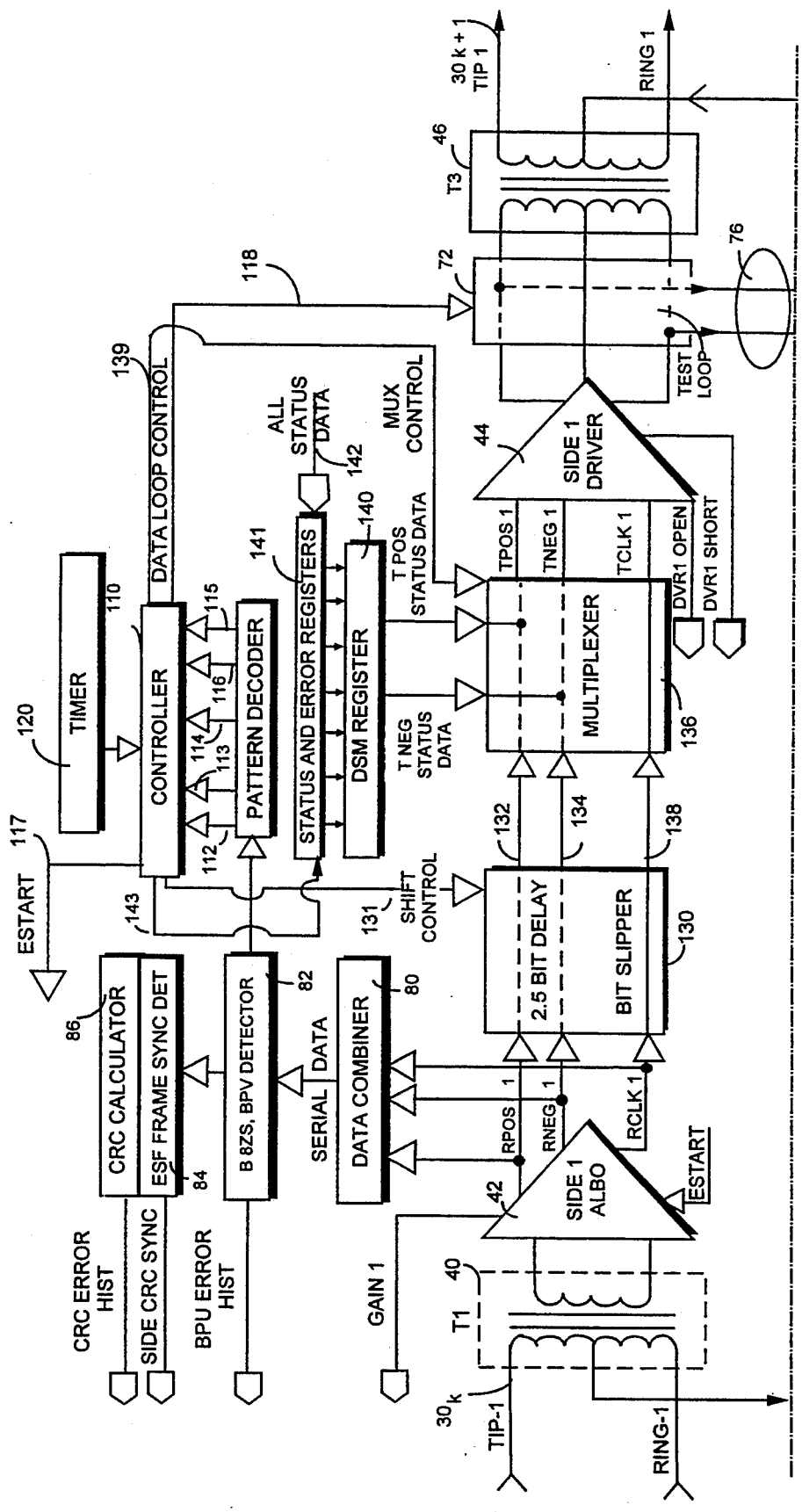
FIG. 2A is a schematic view of a first side of a testable telephone line repeater according to an embodiment of the invention.
Figure 2B:
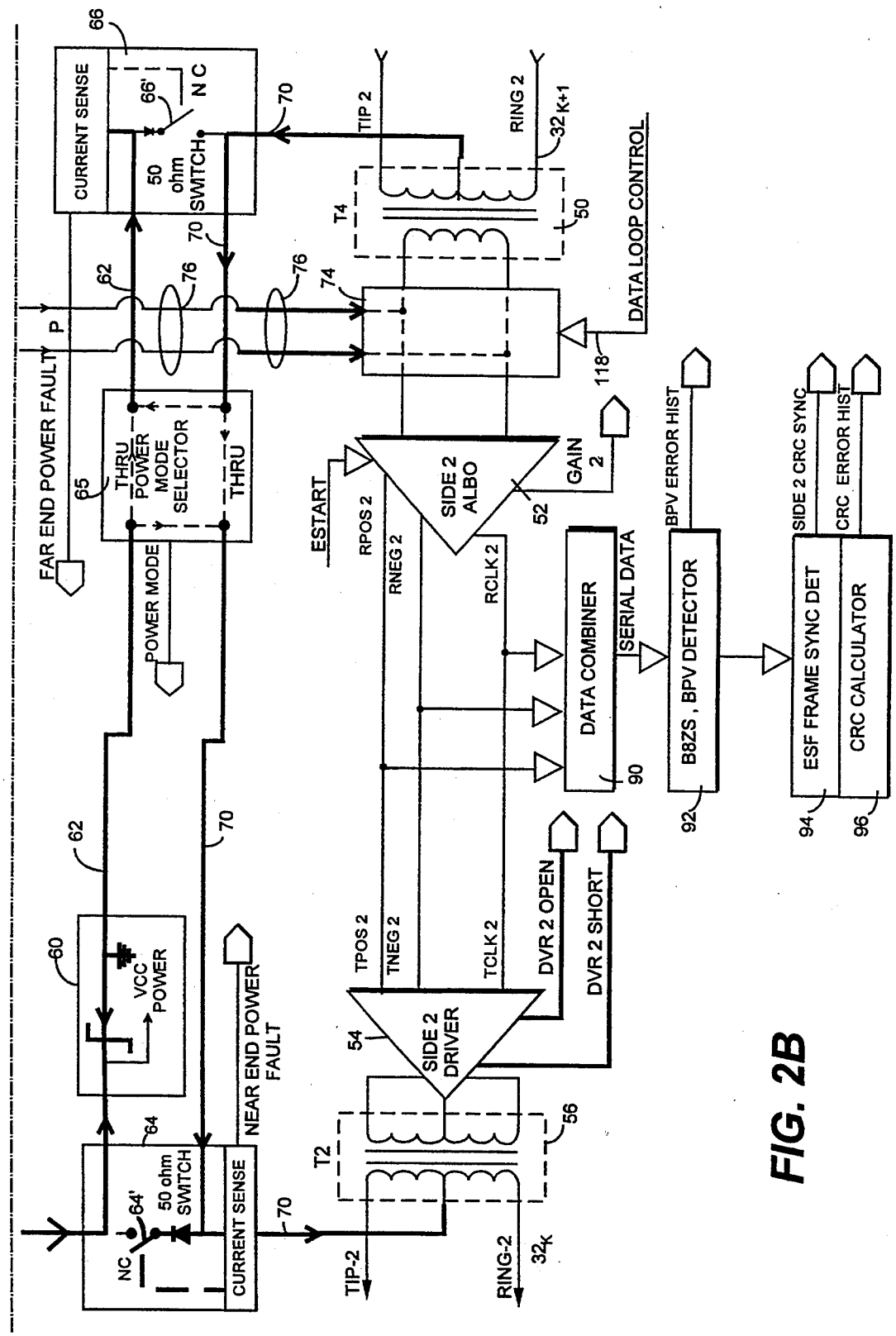
FIG. 2B is a schematic view of a second side of a testable telephone line repeater according to an embodiment of the invention.

A repeater 28 according to the invention is shown in greater detail in FIGS. 2A and 2B. Each repeater 28 includes, for each side of the network 26, an input transformer, an automatic line build out (ALBO)/regenerator device; an output driver; and, an output transformer. In this regard, as shown in FIG. 2A, side one of the repeater 28 includes a side one input transformer 40; a side one ALBO/regenerator 42; a side one output driver 44; and, a side one output transformer 46. Similarly, as shown in FIG. 2B, side two of the repeater 28 includes a side two input transformer 50; a side two ALBO/regenerator 52; a side two output driver 54; and, a side two output transformer 56.

The repeater 28 obtains digital indications whether the drivers 44, 54 are experiencing open or short line conditions. In this respect, when side one driver 44 has a short, a error signal is applied on line DVR1 SHORT. When side one driver 44 has an open circuit, an error signal is applied on line DVR1 OPEN. When side two driver 54 has a short, an error signal is applied on line DVR2 SHORT. When side two driver 54 has an open circuit, an error signal is applied on line DVR2 OPEN. In the illustrated embodiment, the drivers 44, 54 are included in a packaged dual PCM repeater, such as model ST10013 produced by Level One.

As shown in FIG. 2A, the twisted wire pair comprising line segment $30_k$ has both its TIP and RING leads connected to an input coil of the transformer 40. At the far end of side one of the repeater 28, an output coil of the transformer 46 is connected to the TIP and RING leads of the twisted wire pair comprising line segment $30_{k+1}$. As shown in FIG. 2B, the twisted wire pair comprising line segment $32_{k+1}$ has both its TIP and RING leads connected to an input coil of the transformer 50, while the twisted wire pair comprising line segment $32_k$ has both its TIP and RING leads connected to an output coil of the transformer 56.

The repeater 28 further includes a VCC power supply 60 which (through unillustrated connections) supplies power to the constituent elements of the repeater 28. According to known techniques, the power supply 60 derives its power from the network 20 via the transformers of the repeater 28. In this regard, the power supply 60 is shown in FIG. 2B as being connected on a power line 62. Power line 62 extends between a center tap of the input coil of transformer 40 to a power mode selector 65, and from the power mode selector 65 to a center tap of the output coil of the transformer 46.

As shown in FIG. 2B, the power line 62 further has connected thereon a near end current sensor 64 and far end current sensor 66. As used herein, the term "near end" refers to elements of the repeater 28 which operate upon signals ultimately applied to or ultimately received from the first central office 22. Conversely, the term "far end" refers to elements of the repeater 28 which operate upon signals ultimately applied to or ultimately received from the second central office 24.

A line 70 (see FIG. 2B) connects a center tap of the input coil of transformer 50 to the power mode selector 65, and connects the power mode selector 65 with a center tap of the output coil of the transformer 56. In like manner as line 62, line 70 has the near end current sensor 64 and the far end current sensor 66 provided thereon.

The lines 62 and 70 thus establish a 60 milliampere simplex current for the repeater 28. The repeater simplex power can be operated in either a power loop or power thru mode, depending on how the power mode selector 65 is set. In a power loop mode, a near end loop is established involving the next repeater at the near end, as well as lines 62 and 70 of the subject repeater as connected through the power mode selector 65 (see the broken left vertical lines in FIG. 2B). Likewise, in a power loop mode, a far end loop is established involving the next repeater at the far end, as well as lines 62 and 70 of the subject repeater as connected through the power mode selector 65 (see the broken right vertical lines in FIG. 2B). In the power thru, the line 62 and 70 as shown by the broken upper and lower horizontal lines, respectively, in the power mode selector 65. The power mode selector 65 provides a signal POWER MODE which is indicative of the particular mode in which the selector 65 is set.

Each current sensor 64, 66, includes a switch, shown as elements 64' and 66' respectively. When the repeater 28 is in a power loop mode, and when the far end current sensor 66 detects a power fault at the far end of the repeater 28, for example by a cut of either line segment $30_{k+1}$ or line segment $32_{k+1}$, the far end current sensor 66 closes the switch 66' to return power to the repeater 28. Upon detecting the power fault at the far end, the current sensor 66 also generates a signal on line FAR END POWER FAULT indicative of the power fault. The current sensor 64 operates in analogous manner when the repeater is being powered by the far end.

The repeater 28 further includes a first side loop switch 72 and a second side loop switch 74. The loop switch 72 is controllable to connect the output signal of the side one output driver 44 to first ends of loops lines 76 (see FIG. 2A) in addition to the input coils of the side one output transformer 46. The loop switch 74 is controllable to connect the input pins of the side two ALBO/regenerator device 52 to either the second ends of the loop lines 76 or to the output coils of the second side input transformer 50 (see FIG. 2B).

The ALBO/regenerator devices 42, 52 are connected to the output coils of the respective transformers 40, 50. As is understood by the man skilled in the art, the ALBO/regenerator devices 42, 52 receive the input signals in the tri-level return to zero (RZ) format and, in conventional manner, produce regenerated TTL RZ output signals RPOS, RNEG, and RCLOCK. That is, the ALBO/regenerator devices 42, 52 automatically equalize the received signal for the transmission path cable length, and perform clock and data recovery and generation.

The ALBO/regenerator devices 42, 52 thus are any one of a number of such devices capable of operating in an industry standard 239SL T-1 line repeater. In one embodiment of the invention, the ALBO/regenerator devices 42, 52 include components of a dual PCM repeater, such as model ST10013 produced by Level One. Alternatively, the devices 42, 52 can be Level One repeater models LXT312 and LXT313 modified to provide a digital output signals from an equalizer component thereof, with that digital output signal being indicative of the gain of the equalizer. In this regard, when requested to do so, regenerator 42 produces a gain signal GAIN 1 and regenerator 52 produces a gain signal GAIN 2.

The output signals RPOS, RNEG, and RCLOCK from the ALBO/regenerator device 42 (on side one of the repeater 28 as shown in FIG. 2A) are applied along two separate, essentially parallel paths. In this respect, according to one path, the output signal pins of the ALBO/regenerator device 42 are applied to a data combiner 80. The data combiner produces a non-return to zero (NRZ) serial bit output stream from the signals input thereto. A serial output port of the data combiner 80 is connected to an input port of a bipolar violation detector 82. The bipolar violation detector 82 generates an error value on a line BPV ERROR HIST when a bipolar violation is detected in the input data.

A first output port of the BPV detector is connected to an input port of an ESF (Extended Superframe Format) frame synchronization detector 84. The ESF frame synchronization detector 84 generates an error value on a line SIDE 1 CRC SYNC when a framing synchronization error is detected in the input data.

An output port of the ESF frame synchronization detector 84 is connected to an input port of a CRC calculator 86. The CRC calculator 86 generates an error value on a line CRC ERROR HIST when a cyclical redundancy character error is detected in the input data.

In the same manner as described with respect to the first side of the repeater 28, as shown in FIG. 2B the second side of the repeater is provided with a data combiner 90; a BPV detector 92; an ESF frame synchronization detector 94; and, a CRC calculator 96. The detectors 92, 94, and calculator 96 produce respective error signals on the lines BPV ERROR HIST, SIDE 2 CRC SYNC, and CRC ERROR HIST.

Returning now to the BPV detector 82 of the repeater 28, a second output port thereof is connected to apply the serial bit stream from the data combiner 80 to a pattern or signal recognizer, also known as pattern decoder/recognizer 100 or pattern decoder 100. The pattern decoder 100 includes a plurality of registers for storing a predetermined number of the most recently received bits in the serial data stream from the data combiner 80. In addition, the pattern decoder 100 includes hardware logic elements connected to determine when one of a number of predetermined patterns are formed by the bits stored in its registers. As explained hereinafter in greater detail, a pattern decoder 100 examines a bit stream of at least as many as 31 bits of digital data to determine, among other things, whether the bit stream indicates that the repeater 28 should "store data", "start loop" (i.e., "loop back") or "stop loop" (e.g., "loop down")".

The repeater 28 further includes a controller 110. The controller 110 includes conventional hardware circuit elements connected in a manner suitable for preforming the operations depicted by the state diagram of FIG. 6, which operations are described hereinafter. The controller 110 has input ports thereof connected to receive pattern recognition signals from the pattern decoder 100, including a "store data" signal on line 112; a "test select bit locate" signal on line 113; a "start loop" signal on line 114; a "no-op" signal on line 115; and, a "stop loop" signal on line 116. The controller 110 is connected to apply an ESTART signal on line 117 to the ALBO/regenerator devices 42, 52, and a DATA LOOP CONTROL signal on line 118 to the loop switches 72 and 74 (see FIGS. 2A and 2B, respectively). In addition, the controller 110 is connected to a clock or timer 120 and to other devices hereinafter described.

The RZ TTL output signals RPOS, RNEG, and RCLOCK from the ALBO/regenerator device 42 (on side one of the repeater 28 as shown in FIG. 2A) are applied along a second path to input terminals of a bit shifter circuit 130 (also known as a bit slipper). The bit shifter circuit 130 is described in further detail with reference to FIG. 3. The bit shifter circuit also receives a shift control signal on line 131 from the controller 110.

Output pins of the bit shifter circuit 130 are applied on lines 132 and 134 to first channel input pins of a multiplexer system 136. The RCLK 1 signal (on line 138) passes through the multiplexer system 136 regardless of which channel is selected. A channel select pin on the multiplexer system 136 is connected to receive a MUX CONTROL signal on line 139 from the controller 110. Output pins of the multiplexer system 136 are connected to the side one output driver 44.

The multiplexer system 136 thus receives a first channel of data from the bit shifting circuit 130. The multiplexer system 136 receives a second channel of information from a 31-bit diagnostic status message ("DSM") memory register 140 connected to second channel input terminals of the multiplexer system 136. The DSM register 140 is in turn connected to registers (memories) included in a bank of status and error registers 141. The status and error registers 141 receive and store therein signals applied thereto on the lines POWER MODE, DVR1 OPEN, DVR1 SHORT, DVR2 OPEN, DVR2 SHORT, NEAR END POWER FAULT, FAR END POWER FAULT, GAIN 1, BPV ERROR HIST (side 1), SIDE 1 CRC SYNC, CRC ERROR HIST (side 1), GAIN 2, BPV ERROR HIST (side 2), SIDE 2 CRC SYNC, CRC ERROR HIST (side 2), application of these signals to the registers 141 being generally depicted by lead 142 in FIG. 2A. The status and error registers 141 also receive a REGISTER FILL signal on line 143 from the controller 110 whereby the status and error registers 141 are instructed to transmit their contents to the DSM register 40. However, if any of the detectors or sensors have detected errors in the most recent five minutes, indications of those errors are discarded as having probably occurred as a result of network testing efforts.

The output RPOS 2, RNEG 2, and RCLK 2 signals from the side two ALBO/regenerator device 52 (see FIG. B) are applied directly to the side two driver 54, as well as to the side two data combiner 90 in the manner previously described.

Figure 3:
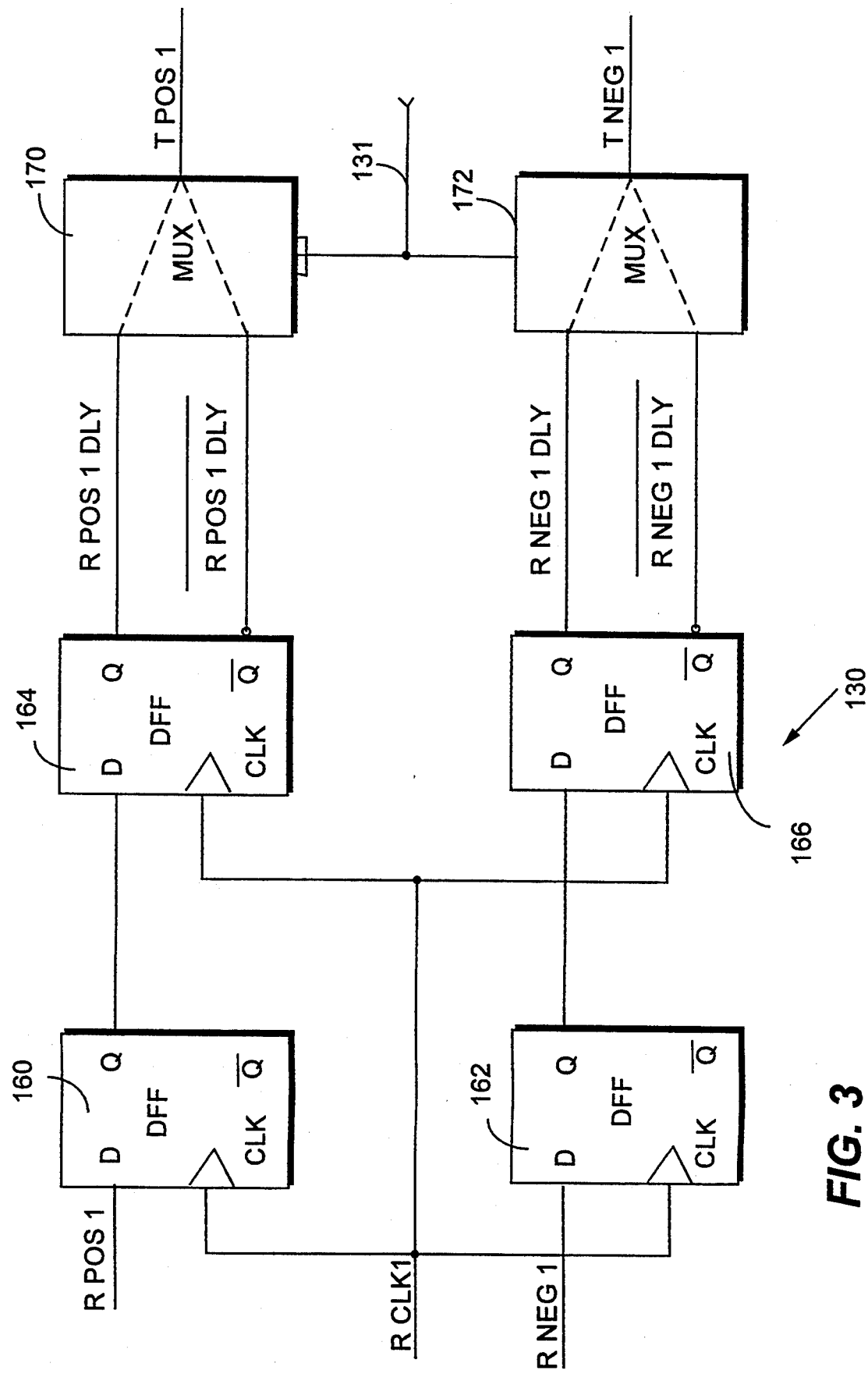
FIG. 3 is a schematic view of a bit shifter circuit included in the telephone line repeater of the embodiment of FIG. 2.

FIG. 3 shows in detail an embodiment of the bit shifting circuit 130 of the repeater 28. The circuit 130 includes four D Flip Flops ("DFF") 160, 162, 164, and 166; and, a pair of multiplexers 170, 172.

Each of the DFFs 160, 162, 164, and 166 of the circuit 130 of FIG. 3 have their clock input pins connected to the RCLK 1 output pin of the ALBO/regenerator device 42. The first DFF 160 has its D input pin connected to the RPOS 1 output pin of the ALBO/regenerator device 42; the second DFF 162 has its D input pin connected to the RNEG 1 output pin of the ALBO/regenerator device 42. The D input pin of the DFF 164 is connected to the Q output pin of the DFF 160; the D input pin of the DFF 166 is connected to the Q output pin of the DFF 162.

The Q output pin of the DFF 164 is connected by line RPOS1DLY to a first input channel of the multiplexer 170; the inverted Q output pin of the DFF 164 is connected by line inverted RPOS1DLY to a second input channel of the multiplexer 170. Similarly, The Q output pin of the DFF 166 is connected by line RNEG1DLY to a first input channel of the multiplexer 172; the inverted Q output pin of the DFF 166 is connected by line inverted RNEG1DLY to a second input channel of the multiplexer 172. Channel select pins of the multiplexers 170 and 172 are connected by the shift control line 131 to the controller 110.

Returning now to FIG. 1, each central office 22, 24 includes unillustrated but well-known equipment such as a channel bank and a cross connect. In addition, each central office includes an office bay repeater OBR, represented by broken lines as being housed in the central offices 22, 24 of FIG. 1.

Figure 4:
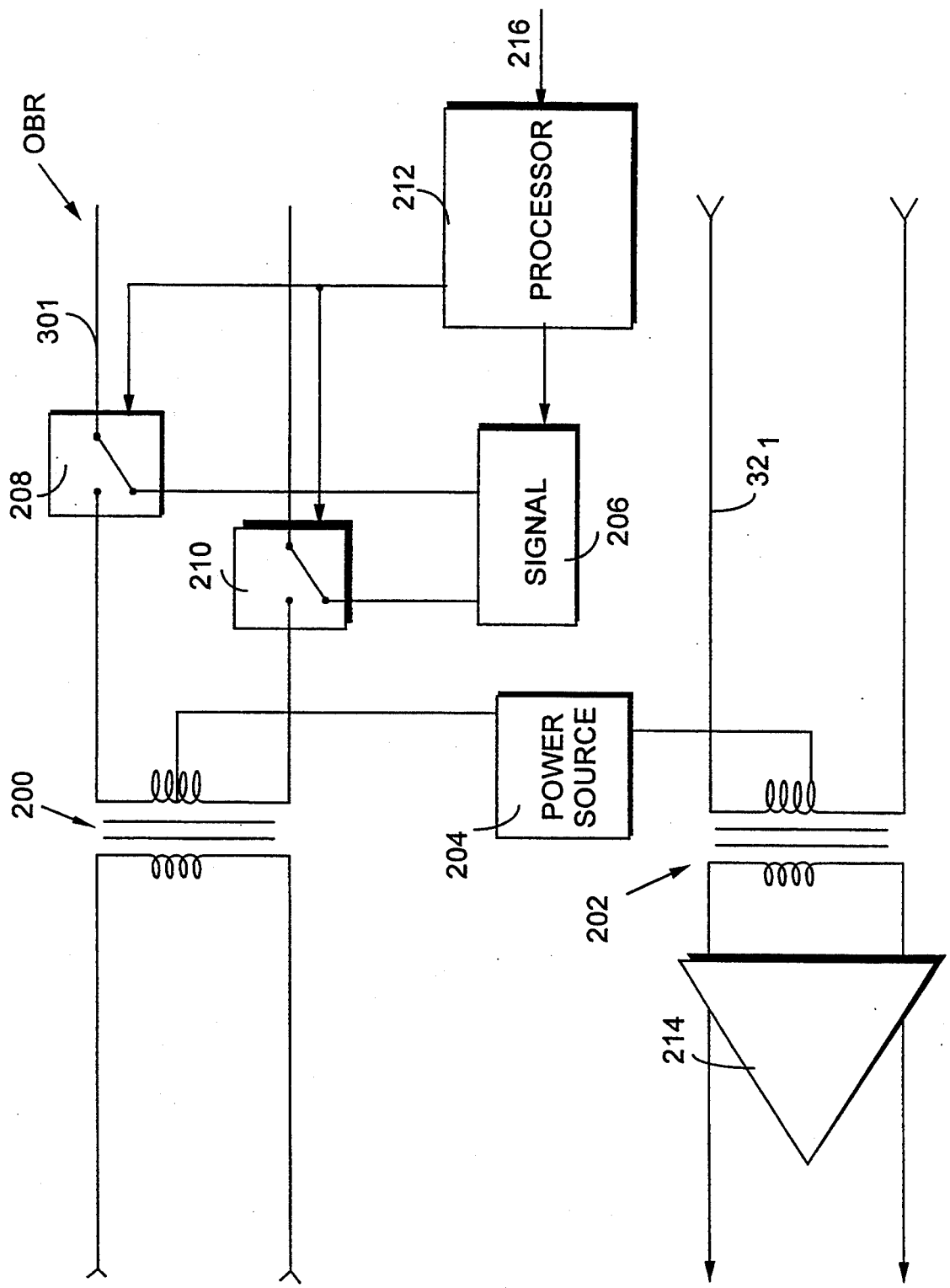
FIG. 4 is a schematic view of a portion of a telephone central office.

FIG. 4 of the invention shows in more detail an office bay repeater (OBR) for central office 22, modified for use with the present invention. The OBR includes a side one output transformer 200; a side two input transformer 202; a power source 204 connected between center taps of far end coils of the transformers 200 and 202; a signal source 206; switches 208 and 210; a processor 212; and, a side two input driver 214. The switches 208 and 210 are controlled by the processor 212 in order to gate therethrough either the transformed first side output signal or a signal emanating from the signal source 206. In this respect, the signal which emanates from the signal source 206 is programmable therein via input line 216 of the processor 212. Input line 216 may be connected to a data entry device, such as a keyboard, for example.

OPERATION

In normal operation, multiplexed T-1 telephone signals are applied by the first central office 22 to the line segments 30 and by the second central office 24 to the line segments 32. Each repeater 28 provided in the network 20 regenerates and repeats the multiplexed T-1 signals in customary fashion. In this respect, in normal operation, the controller 110 permits the bit shift circuit 130 and the multiplexer system 136 (see FIG. 2A) to transmit the RPOS 1, RNEG 1, and RCLK 1 signals therethrough without bit shifting and without the introduction of additional (e.g., diagnostic) data.

In the above regard, it should be noted that, at any time, the bit shifting circuit 130 will have stored therein the most recent and next-most recent values for the signals RPOS 1 and RNEG 1. In this respect, the Flip-Flops 160 and 162 have stored therein the most recent values for the signals RPOS 1 and RNEG 1, respectively, while the Flip-Flops 164 and 166 have stored therein the next-most recent values for the signals RPOS 1 and RNEG 1, as represented by outputs RPOS1DLY and RNEG1DLY, respectively. The bit shifting circuit thus provides a slight (2.5 bit) delay in the transmission of signals from the ALBO/regenerator 42 to the multiplexer system 136.

As mentioned previously, telephone networks and repeaters are subject to faults or difficulties. Such faults include (1) repeater failures and span section hard faults; (2) simplex path cuts; and, (3) dribbling faults or intermittent failures.

Span section hard faults include tip/ring shorts or opens. Historically, such hard span faults (described above) and repeater failures are locationally sectionalized by travel to the mid-span of the network, testing the mid-span repeater, and then moving east or west as the results dictate. As mentioned previously, this is a time and labor intensive approach.

The repeaters 28 of the present invention include on-going diagnostic information-gathering capability. In this respect, should any one of the afore-mentioned types of errors occur at a repeater, an indication of the occurrence of the error is stored in a corresponding register included in the bank of status and error registers 141. The occurrence of errors are detected by the sensors, detectors, and calculators included in the repeater 28, including the current sensors 64, 66; the drivers 44, 54; the BPV detectors 82, 92; the ESF frame sync detectors 84, 94; and, the CRC calculators 86, 96. The detection or sensing of an error condition at any of these sensors/detectors causes an error indication to be set in the corresponding register included in the bank 141. After an error indication has been set in a register in bank 141 for twenty-four hours, the particular register is cleared to indicate a non-error condition.

According to the present invention, faults or difficulties are located within the network 20 and diagnosed by transmitting, from a central office, a test-inducing signal for a predetermined length of time on the out-going lines of the central office. The test-inducing signal, also known as a "start loop" signal, has the format shown in FIG. 5. The "start loop" signal is an unframed in-band code of 31 digital bits having the following pattern:

10001AAAAAAAAAAAAAAAAAAAAAAAAA-
AA

The first five bits of the start loop signal are designated as a header or preamble 300. The start loop signal has a predetermined value for its preamble, particularly the bit pattern "10001". The bit pattern "10001" is characteristic of the start loop signal, as opposed to other types of signals, such as the stop loop signal and no-operation signals, described hereinafter.

Figure 5:
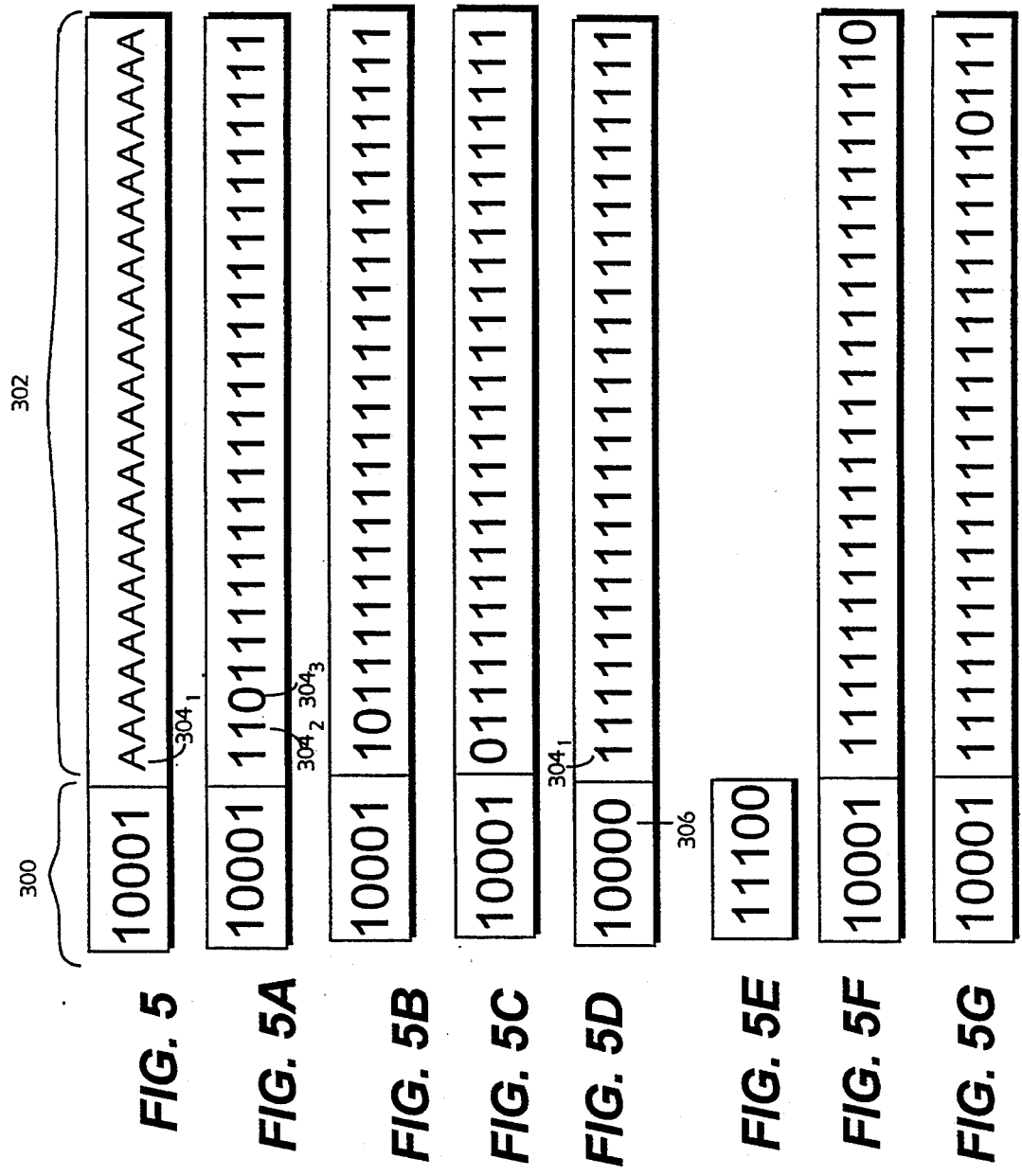
FIG. 5 is a diagrammatic view of the format and contents of a generic "start loop" code according to an embodiment of the invention.

In addition to a preamble, the start loop signal includes a 26-bit address field designated by reference number 302 in FIG. 5. Each "A" shown in the address field 302 of FIG. 5 corresponds to an address subfield (represented by numerals $304_1$–$304_{26}$). In the preferred embodiment, each subfield 304 is a digital value, with all of the subfields having the digital value 1, except for a single subfield which is set to the digital value zero (0). The position of this single zero from the left most significant position within the address field 302 designates which of the repeaters $28_1$–$28_N$ is being addressed. Thus, the digital value zero in the address field serves as a predetermined test select designation or convention. The digital value zero is different than the other digital values (1) in the address field.

FIG. 5B provides an example of a start loop signal as transmitted by the first central office 22 of FIG. 1, wherein the particular repeater to be addressed is repeater $28_3$. In this regard, subfield $304_3$ of the start loop signal is configured according to the predetermined test select convention, i.e., is set to zero.

All signals applied on the first side of the network 20 to the repeaters 28 are regenerated in the customary matter by the ALBO/regenerator device 42. The RZ TTL signals are combined to a serial NRZ format stream by the data combiner 80. The serial NRZ is applied to the pattern decoder 100. As indicated previously, the pattern decoder 100 includes hardware elements which store and shift therethrough in first-in, first out sequence of at least as many as the most recent 31 bits of information received by the repeater 28.

Transmission up the network 20 of the start loop signal of FIG. 5B, for addressing repeater $28_3$, will now be described, beginning first with the operation of the first repeater $28_1$ of the network 20. The repeater $28_1$ receives the start loop signal shown in FIG. 5A.

Figure 6:
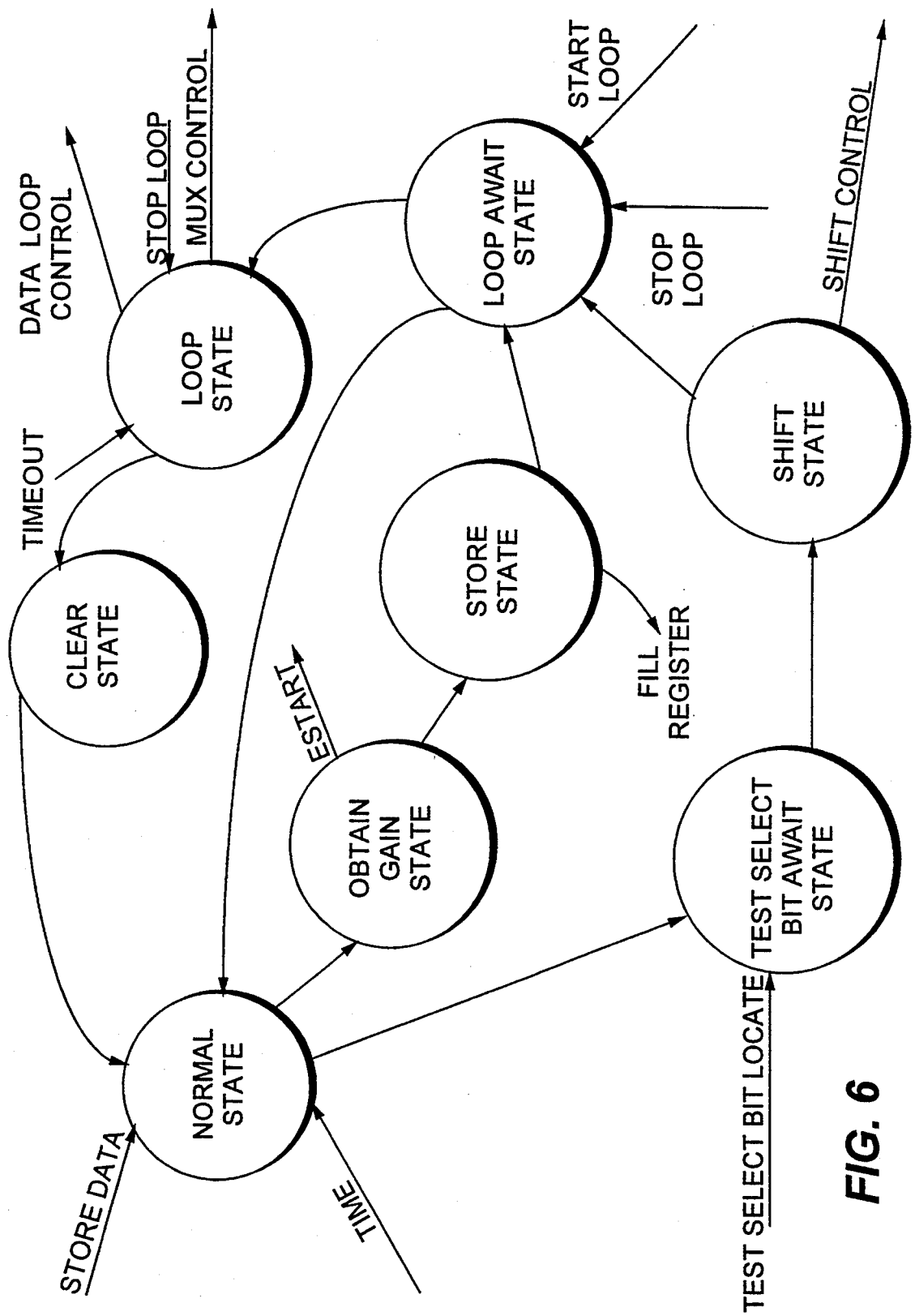
FIG. 6 is a schematic view of an operational state diagram for a controller including in a repeater according to an embodiment of the invention.

When the pattern decoder 100 of repeater $28_1$ recognizes a start loop signal, the pattern decoder 100 sends a STORE DATA signal on line 112 to the controller 110. The controller also receives clock pulses (a TIME signal) from the timer 120. After the controller 110 has received a STORE DATA signal from the pattern decoder 100 for more than four seconds, as shown in FIG. 6 the controller 110 initiates operation of two parallel states, an OBTAIN GAIN STATE and a TEST SELECT BIT AWAIT STATE.

In the OBTAIN GAIN STATE the controller 110 generates an ESTART signal for application on line 117 to the ALBO/regenerator devices 42 and 52. In response to the ESTART signal, the ALBO/regenerator devices 42 and 52 return digital equalizer gain values for the signals GAIN and GAIN 2, respectively, to the corresponding registers in the bank 141.

After the ALBO/regenerator devices 42 and 52 have had sufficient time to return the digital equalizer gain values (signals GAIN 1 and GAIN 2), the controller 110 moves from the OBTAIN GAIN STATE to a STORE STATE. In the STORE STATE the controller generates a DSM REGISTER FILL signal on line 143, whereby the plurality of registers in the bank 141 transfer their contents into the DSM register 140. After generating the DSM REGISTER FILL signal, the controller 110 moves from the STORE STATE to the LOOP AWAIT STATE.

In the TEST SELECT BIT AWAIT STATE, the controller 110 awaits a signal from the pattern decoder on test select bit locate line 113. In this respect, the pattern decoder 110 generates the test select bit locate signal on line 113 when the pattern decoder 110 locates the predetermined test select value in the address field 302. The test select bit locate signal is applied to the controller when RPOS1 and RNEG1 signals corresponding to the digital zero address bit (i.e., the test select address bit) are in the Flip-Flops 160 and 162 of the bit shifter circuit 130 of FIG. 3.

After the controller 110 receives the test select bit locate signal on line 113, the controller 110 moves to a SHIFT STATE. During the SHIFT STATE the controller 110 generates a shift control signal on line 131 to the bit shift circuit 130.

When the bit shift circuit 130 of the repeater $28_1$ receives the shift control signal on line 131, the D Flip-Flops 164, 166 have stored therein values corresponding to the digital "1" value of subfield $304_2$ of FIG. 5A, while the D Flip-Flops 160, 162 have stored therein values corresponding to the digital "0" value of subfield $304_3$ of FIG. 5A. Upon application of the shift control signal on line 131 to the channel select pins of the multiplexers 170, 172 included in the bit shifting circuit 130, the multiplexers pass therethrough the inverted signals (inverted RPOS1DLY and inverted RNEG1LDY) from the inverted Q output pins of the Flip-flops 164, 166, rather than the non-inverted signals from the Q output pins of the Flip-flops 164, 166. Accordingly, as shown in FIG. 5B, the subfield $304_3$ is inverted to become a digital "1" rather than a digital "0".

Upon the application of the next clock signal on line RCLK1 to the bit shifting circuit 130, the contents of the Flip-flops 160, 162 are transferred to the Flip-flops 164. The shift control signal on line 131 remains on so that the multiplexers 170, 172 again pass therethrough the inverted signals (inverted RPOS1DLY and inverted RNEG1LDY) from the inverted Q output pins of the Flip-flops 164, 166. Accordingly, as shown in FIG. 5B, the subfield $304_2$ is inverted to become a digital "0" rather than a digital "1". Thus, it is seen that the application of the shift control signal on line 131 from the controller 131 enables the bit shifting circuit to effectively shift the test select bit (i.e., the zero bit) by one subfield (i.e., one bit position) in a predetermined direction (i.e., leftward). In effect, therefore, the bit shifting circuit 130 moves the digital "0" forward in time by imposing a delay of two unit intervals. In so doing, the bit shifting circuit 130 does not foil the alternate mark inversion format of the signals.

The repeater $28_1$ applies the start loop signal, modified as seen in FIG. 5B, on line segment $30_2$ for application to the next repeater in the network 20, particularly repeater $28_2$. In this respect, TPOS1 and TNEG1 signals corresponding to the modified start loop signal of FIG. 5B are passed through the multiplexer system 136 for application to the side one driver 44, and from thence to the line segment $30_2$.

After issuing the shift control signal on line 1, the controller 110 of repeater $28_1$ moves to the LOOP AWAIT STATE. In the LOOP AWAIT STATE the controller 110 awaits either a start loop signal on line 114, or a stop loop signal on line 116. Both the start loop signal and the stop loop signal are generated by the pattern decoder 100.

The start loop signal is generated when the pattern decoder determines the location of the test select bit in the address field indicates that this particular repeater is the repeater being addressed by the central office. When a start loop signal is generated, the controller 110 moves to a LOOP STATE.

In view of the fact the particular start test signal of FIG. 5A transmitted by first central office 22 addressed the repeater $28_3$ rather than the first repeater $28_1$, the controller 110 of the repeater $28_1$ will not enter the LOOP STATE. Rather, the controller 110 will expect to receive a stop loop signal.

The stop loop signal, described in more detail below, is generated when the pattern decoder 100 determines the central office 22 has transmitted a special signal known as a stop loop signal. When a start loop signal is generated, the controller 110 moves to back to its NORMAL STATE.

Upon reception of the start loop signal of FIG. 5B (which is the start loop signal of FIG. 5A modified by repeater $28_1$ in the manner described above), the repeater $28_2$ operates in similar manner as repeater $28_1$. However, the pattern decoder 110 of the repeater $28_2$ will determine that the test select bit ("0") is in the subfield $304_2$ of the modified start loop signal. Accordingly, the controller 110 of the repeater $28_2$ generates a shift control signal on line 131 at such a time that the bit shifting circuit 130 will output the further modified start loop signal shown in FIG. 5C. In this respect, the bit shifting circuit 130 of the repeater $28_2$ moves the test select bit from the subfield $304_2$ to the subfield $304_1$. TPOS1 and TNEG1 signals corresponding to the modified start loop signal of FIG. 5C are then applied on line segment $30_3$ to the next repeater in the network, i.e., repeater $28_3$.

When the repeater $28_3$ receives the start loop signal of FIG. 5C, its controller 110 operates in similar manner as the controllers of the previously-described repeaters. Upon locating the test select (e.g., zero) bit in the address field, the controller 110 generates the shift control signal on line 131 to the bit shifting circuit 130. In a manner understood from the previous description, the bit shifting circuit 130 then inverts the TPOS1 and TNEG1 signals corresponding to start signal subfield $304_1$ and the TPOS1 and TNEG1 signals corresponding to the least most significant bit 306 of the header 300. Thus, the bit shifting circuit 130 of the repeater $28_3$ generates TPOS1 and TNEG1 signals corresponding to the following digital bit signal:

100001111111111111111111111111

This digital signal is know as a no-operation ("no-op") signal. The no-op signal is applied to all further repeaters 28 in the network 20, beginning with repeater $28_4$.

Once a repeater 28 in the network 20 generates a no-op signal, the further upstream repeaters will all receive the no-op signal rather than the start loop signal. In this regard, the pattern detector 100 of each repeater is configured to recognize the no-op signal. Upon recognition of the no-op signal, the pattern detector 110 sends a signal on no-op line 115 to the controller. As long as a repeater 28 receives the no-op signal, the repeater merely passes the no-op signal on to the next upstream repeater 28.

Returning now to the description of the operation of repeater $28_3$, its controller 110 moves from the SHIFT STATE to the LOOP AWAIT STATE in similar manner as the repeaters previously described. However, the pattern detector 100 of the repeater $28_3$ will determine from the start loop signal of FIG. 5C that repeater $28_3$ is the particular repeater being addressed by the central office 22. In this regard, the pattern decoder 100 is configured to determine when the test select bit (i.e., the digital zero) is in the most significant one of the subfields (i.e., subfield $304_1$) of the address field 302. When the pattern decoder 100 makes this determination, it sends a signal (START LOOP) on line 114 to the controller 110, thereby moving the controller 110 to a LOOP STATE (see FIG. 6).

In the LOOP STATE the controller 110 of repeater $28_3$ generates two pertinent signals: the DATA LOOP CONTROL signal on line 118 and the MUX CONTROL signal on line 139. The DATA LOOP CONTROL signal on line 118 causes the switches 72 and 74 (see FIGS. 2A and 2B, respectively) to connect the output of the side one driver 44 to the input of the side two ALBO/regenerator device 52, as well as remaining connected to the side one output transformer 46. Accordingly, the DATA LOOP CONTROL signal returns, or loops, the signals from the side one driver 44 back to the second side of the repeater 283, whereby the signals are returned (via the second sides of the repeaters $28_2$ and $28_1$) to the first central office 22.

The MUX CONTROL signal on line 139 from the controller 110 is applied to the channel select pins of the multiplexer system 136 in order to alternate the input to the side one driver 44. In this regard, the MUX CONTROL signal is activated so that the multiplexer system 136 first passes therethrough the 31-bit no-op signal generated by the circuit 130, and then a 31-bit diagnostic information signal (i.e., the contents of the DSM register 140). For as long as the repeater $28_3$ is in the LOOP STATE, the multiplexer system 136 alternates in sequence the transmission of the no-op signal and the diagnostic information signal.

Figure 7:
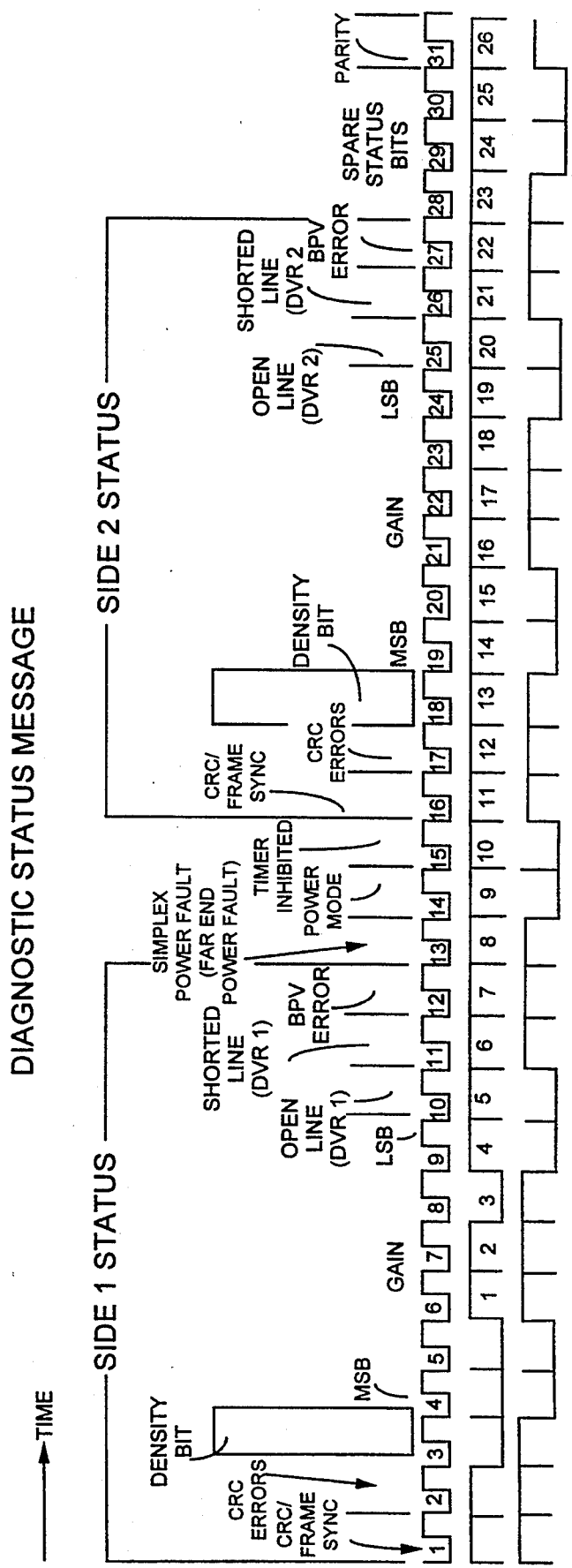
FIG. 7 is a diagrammatic view of the format and contents of diagnostic status message generated by a repeater according to an embodiment of the invention.

The contents of the no-op signal has been described above. The contents of the diagnostic information signal (also known as the Diagnostic Status Message "DSM") is understood by reference to Table I and to FIG. 7. The format of the "DSM" signal as shown in FIG. 7 reveals that the DSM signal includes a plurality of information segments regarding a plurality of aspects of the performance of the repeater. The information segments are the values initially stored in the bank of registers 141 and then transmitted to the DSM register 140. The DSM signal includes information segments pertaining to both sides of the repeater 28. In this regard, it will be seen from FIG. 7, Table I, as well as from FIGS. 2A and 2B, that the DSM signal includes information pertaining to CRC/frame sync; CRC errors; equalizer gain; simplex power cut; and bipolar violation errors for each side of the repeater 28. The plurality of segments also include information pertaining to abnormal line conditions, such as driver shorts and driver open circuits.

The controller 110 of repeater $28_3$ leaves the LOOP STATE upon either the receipt of a stop loop signal (on line 116) or the receipt of a TIMEOUT signal from the timer 120. In the latter regard, unless a timer inhibit option is preset (as indicated by bit 15 in the DSM message of FIG. 7), the TIMEOUT signal is generated automatically after the repeater $28_3$ has been in the LOOP STATE for 30 minutes. Upon leaving the LOOP STATE, the controller 110 of repeater $28_3$ enters a CLEAR STATE in order to clear its register bank 141 and its DSM register 140.

As mentioned above, one way to take a repeater 28 out of the LOOP STATE is to send the repeater a stop loop signal from the central office 22. In the illustrated embodiment (see FIG. 5E), the stop loop signal has the following value, which is repeated for at least five seconds:

11100

Thus, the testable repeaters 28 of the present invention facilitate remote locational sectionalization by transmitting a start loop signal from the first central office 22 to the mid-span repeater (e.g., repeater $28_3$, in the manner aforedescribed) in an attempt to loop the mid-span repeater $28_3$. If the mid-span repeater $28_3$ can be successfully looped (as described above), the fault is further down span from the first central office 22. Otherwise, the fault is upstream (e.g., toward) the first central office 22. In either case, the next step is to attempt to loop another repeater which is half way from mid-span in the direction of the fault. This is continued until a section of the network 20 can be identified where a repeater 28 on the end closest to the central office can be looped and the next repeater 28 cannot. Once this section has been identified, a repair technician can be dispatched.

When the simplex path is cut, and if the cut span is single ended powered, the repeater 28 will automatically implement (via switch 64' or 66') a simplex loop to restore power to the repeaters between it and the central office. Assume, for example, that a cut occurred on line segment $30_4$ upstream from repeater $28_3$. When sent the "start loop" code of FIG. 5F, the pattern of FIG. 5G will be returned to the first central office 22. Thus, examination of the returned fault location pattern at the central office 22 will directly indicate the particular repeater (e.g., repeater $28_3$). Normal operation is automatically resumed when the simplex path is restored.

When a dribbling or intermittent failure is suspect, the central office (e.g., central office 22) can query each repeater 28 to isolate the first occurrence of a dribbling failure. This information is obtained by successfully looping each repeater 28 in the manner previously described. When looped, each repeater 28 transmits the DSM signal with the information shown in Table 1 (see also FIG. 7). This information is provided for both sides of the repeater 28.

The test-related signals described above (e.g., the start loop signal and the stop loop signal) can be applied to the network 20 in a number of ways. At a conventional central office, the signals can be transmitted up the network 20 using common jacking techniques. In the more sophisticated central office having the office bay repeater (OBR) shown in FIG. 4, on the otherhand, the test-related signals are applied to the processor 212 via data entry means such as a keyboard. Upon receipt of the test-related signals, the processor 212 loads the test-related signal into a register such as signal source 206, and further controls the switches 208 and 210 so that the test-related signal is transmitted up the network for the requisite period of time.

Thus, the present invention provides an automatic and position dependent addressing scheme for repeaters 28 included in a network 20. Automatic and position dependent addressing facilitates reconfiguration of the network to include more or less repeaters, without having to change circuitry or address switches at each repeater. Moreover, the automatic and position dependent addressing method and apparatus of the current invention eliminates potential for improper address setup at installation. Importantly, the invention also facilitate the rapid and direct sectionalization of faults and difficulties, including both hard and dribbling span failures.

As additional benefits, the repeaters of the present invention provide diagnostic information, including diagnostic information related to driver opens and shorts; powering status; signal level (gain); CRC errors; and BPV errors.

While the invention has been particularly shown and described with reference to the preferred embodiments thereof, it will be understood by those skilled in the art that various alterations in form and detail may be made therein without departing from the spirit and scope of the invention.

TABLE 1

DSM Format
CCDLLLLLLOSBIITCCDLLLLLLOSBXXXP
1..............................................................31

| Bit | | | |
|---|---|---|---|
| Bit 1-2 | C Bits | CRC Status (Side 1) | |
| | C0 | CRC Acquired | 0=no, 1=yes |
| | C1 | 24 Hour History | 0=no errors, 1=1 or more errors |
| Bit 3 | D Bit | Density Control Bit | Always 1 |
| Bits 4-9 | L Bits | Side 1 Input Level | |
| Bit 10 | O Bit | Transmiter Open (Side 1) | 0=Open, 1=Normal |
| Bit 11 | S Bit | Transmiter Short (Side 1) | 0=Short, 1=Normal |
| Bit 12 | B Bit | 24 Hour BPV Status (Side 1) | 0=Normal, 1=Forced Loop |
| Bit 13-14 | I Bits | Simplex Current Path | |
| | I0 | Auto Loop | 0=Normal, 1=Forced Loop |
| | I1 | Power Option | 0=Loop, 1=Thru |
| Bit 15 | T Bit | Auto Loop Down Timer | 0=Disabled, 1=Enabled |
| Bit 16-17 | C Bits | CRC Status (Side 2) | |
| | C0 | CRC Acquired | 0=no, 1=yes |
| | C1 | 24 Hour History | 0=no errors, 1=1 or more errors |
| Bit 18 | D Bit | Density Control Bit | Always 1 |
| Bits 19-24 | L Bits | Side 1 Input Level | |
| Bit 25 | O Bit | Transmiter Open (Side 2) | 0=Open, 1=Normal |
| Bit 26 | S Bit | Transmiter Short (Side 2) | 0=Short, 1=Normal |
| Bit 27 | B Bit | 24 Hour BPV Status (Side 2) | 0=Normal, 1=Forced Loop |
| Bits 28-30 | X Bits | Reserved | normally 0 |
| Bit 31 | P Bit | Odd Parity | Total Number Of "1s" Odd |

The embodiments of the invention in which an exclusive property or privilege is claimed are defined as follows:

1. A method of testing a telephone line network having a set of repeaters connected on first and second sides of the line network between central offices of the network, the method comprising:
   transmitting an interrogating signal on a first side of the line network, the interrogating signal being a digital, in-band, signal including a constant-length address field having a plurality of subfields including at least one unique subfield thereof corresponding to each repeater included in the set of repeaters, wherein for a repeater in the set to be interrogated, its corresponding subfield is configured according to a predetermined interrogate select convention;
   repeaters included in the network examining the interrogating signal to determine if they are the repeater to be interrogated and changing, in the address field, a position of at least one of the subfields; and,
   causing the repeater which determines that it is the repeater to be interrogated to transmit test-indicative information on a second side of the line network.

2. The method of claim 1, wherein for a given repeater, the position of a subfield corresponding to the given repeater in the address field is in a predetermined relationship with a physical location of the given repeater with respect to the set of repeaters.

3. The method of claim 1, wherein the interrogating signal includes a preamble recognizable by all repeaters included in the network.

4. The method of claim 1, and wherein the subfield for the repeater to be interrogated has stored therein a digital value which is different than the digital values of the other subfields.

5. The method of claim 4, wherein the subfield for the repeater to be interrogated has the digital value of zero stored in its corresponding subfield.

6. The method of claim 1, wherein as a repeater in the set receives the interrogating signal, each repeater shifts the address field by one subfield in a predetermined direction, and wherein the repeater then transmits the interrogating signal with the shifted address field therein to a further repeater in the set.

7. The method of claim 6, wherein repeaters included in the network determine if they are the repeater to be interrogated by examining the interrogating signal to determine if their respective subfields are configured according to the predetermined interrogate select convention.

8. The method of claim 7, wherein repeaters included in the network determine if they are the repeater to be interrogated by examining an extreme significant one of the subfields in the address field.

9. The method of claim 8, wherein a repeater determines that it is the repeater to be interrogated if a digital zero value is stored in an extreme significant one of the subfields in the address field.

10. The method of claim 6, wherein shifting of the subfield of the repeater to be interrogated causes a predetermined message to be transmitted to remaining repeaters in the network.

11. The method of claim 1, further comprising the step of causing the repeater which determines that it is the repeater to be interrogated to transmit repeater diagnostic information on a second side of the line network.

12. The method of claim 1, wherein the constant-length address field corresponds to a first predetermined constant number, and wherein only a second predetermined constant number of digits in the address field has a first of two of digital values.

13. The method of claim 12, wherein the first predetermined constant number is "26" and the second predetermined constant number constant number is "4".

14. In a telephone line network of the type having a set of repeaters connected on first and second sides of the line network between central offices of the network, the improvement comprising:
a transmitter for transmitting a interrogating signal on a first side of the line network, the interrogating signal being a digital, in-band, signal including a constant-length address field having a plurality of subfields including at least one unique subfield thereof corresponding to each repeater included in the set of repeaters, wherein for a repeater in the set to be interrogated, its corresponding subfield is configured according to a predetermined interrogate select convention;
signal recognizer provided in the repeaters included in the network for examining the interrogating signal, whereby each examining repeater determines if it is the repeater to be interrogated; and,
a controller provided in the repeaters for changing, in the address field, a position of at least one of the subfields and for causing the repeater which determines that it is the repeater to be interrogated to transmit test-indicative information on a second side of the line network.

15. The apparatus of claim 14, wherein for a given repeater, the position of a subfield corresponding to the given repeater in the address field is in a predetermined relationship with a physical location of the given repeater with respect to the set of repeaters.

16. The apparatus of claim 14, wherein the interrogating signal includes a preamble recognizable by all repeaters included in the network.

17. The apparatus of claim 14, and wherein the subfield for the repeater to be interrogated has stored therein a digital value which is different than the digital values of the other subfields.

18. The apparatus of claim 17, wherein the subfield for the repeater to be interrogated has the digital value of zero stored in its corresponding subfield.

19. The apparatus of claim 14, further comprising a signal shifter provided in each repeater for shifting the address field by one subfield in a predetermined direction upon reception of the interrogating signal.

20. The apparatus of claim 19, wherein the signal recognizer provided in repeaters included in the network determine if they are the repeater to be interrogated by examining the interrogating signal to determine if their respective subfields are configured according to the predetermined interrogate select convention.

21. The apparatus of claim 20, wherein the signal recognizer provided in repeaters included in the network determine if they are the repeater to be interrogated by examining an extreme significant one of the subfields in the address field.

22. The apparatus of claim 21, wherein the signal recognizer of a repeater determines that it is the repeater to be interrogated if a digital zero value is stored in an extreme significant one of the subfields in the address field.

23. The method of claim 14, wherein the constant-length address field corresponds to a first predetermined constant number, and wherein only a second predetermined constant number of digits in the address field has a first of two of digital values.

24. The method of claim 23, wherein the first predetermined constant number is "26" and the second predetermined constant number constant number is "4".

25. A telephone line repeater comprising:
a regenerator for regenerating an input signal on a first side of a telephone line network;
means for applying an output signal to the second side of the network;
a signal recognizer for recognizing, in the regenerated input signal on the first side of the network, an interrogating signal, the interrogating signal being a digital, in-band, signal including a constant-length address field having a plurality of subfields therein, wherein the signal recognizer determines that the repeater is to be interrogated if a predetermined subfield of the interrogating signal is configured according to a predetermined interrogate select convention; and,
a controller for changing, in the address field, a position of at least one of the subfields therein and for causing the transmission of test-indicative information on the second side of the network when the signal recognizer determines that the predetermined subfield of the interrogating signal is configured according to a predetermined interrogate select convention.

26. The apparatus of claim 25, wherein the signal recognizer determines that the repeater is to be interrogated by determining if an extreme significant one of the subfields in the address field is configured according to a predetermined interrogate select convention.

27. The apparatus of claim 26, wherein the address field has digital values stored therein, wherein the signal recognizer determines that the repeater is to be interrogated by determining if an extreme significant one of the subfields in the address field has stored therein a digital value which is different than the digital values of the other subfields.

28. The apparatus of claim 27, wherein the different digital value is zero.

29. The apparatus of claim 25, wherein the controller comprises a signal shifter connected to the regenerator for shifting the address field of the interrogating signal by one subfield in a predetermined direction.

30. The apparatus of claim 29, further comprising means for applying a regenerated output signal to the first side of the network; wherein the first side output signal application means is connected to the shifter; and wherein under the control of the controller the interrogating signal with the shifted address field is selectively transmissible to the first side output signal application means.

31. The apparatus of claim 25, further comprising a switch under the control of the controller for connecting the regenerator on the first side of the network to the means for applying an output signal on the second side of the network when the interrogating signal is recognized by the signal recognizer.

32. The apparatus of claim 25, wherein the constant-length address field corresponds to a first predetermined constant number, and wherein only a second predetermined constant number of digits in the address field has a first of two of digital values.

33. The apparatus of claim 32, wherein the first predetermined constant number is "26" and the second predetermined constant number constant number is "4".

34. A method of testing a telephone line repeater comprising:

regenerating an input signal on a first side of a telephone line network;

recognizing, in the regenerated input signal on the first side of the network, an interrogating signal, the interrogating signal being a digital, in-band, signal including a constant-length address field having a plurality of subfields therein, and determining whether a predetermined subfield thereof is configured according to a predetermined interrogate select convention;

changing, in the address field, a position of at least one of the subfields therein; and, transmitting test-indicative information on a second side of the network when it is determined that the predetermined subfield is configured according to a predetermined interrogate select convention.

35. The method of claim 34, wherein the step of determining whether a predetermined subfield is configured according to a predetermined interrogate select convention includes examining an extreme significant one of the subfields in the address field.

36. The method of claim 35, wherein the address field has digital values-stored therein, and wherein the predetermined interrogate select convention is a digital zero stored in a subfield.

37. The apparatus of claim 34, wherein the constant-length address field corresponds to a first predetermined constant number, and wherein only a second predetermined constant number of digits in the address field has a first of two of digital values.

38. The apparatus of claim 37, wherein the first predetermined constant number is "26" and the second predetermined constant number constant number is "4".

* * * * *